(12) United States Patent
He et al.

(10) Patent No.: US 7,649,930 B2
(45) Date of Patent: Jan. 19, 2010

(54) FILTER EQUALIZATION USING MAGNITUDE MEASUREMENT DATA

(75) Inventors: Yi He, Portland, OR (US); Thomas C. Hill, III, Beaverton, OR (US); Marcus K. Dasilva, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 514 days.

(21) Appl. No.: 11/272,285

(22) Filed: Nov. 9, 2005

(65) Prior Publication Data

US 2007/0104261 A1     May 10, 2007

(51) Int. Cl.
     *H03H 7/30*      (2006.01)
     *H03H 7/40*      (2006.01)
     *H03K 5/159*     (2006.01)

(52) U.S. Cl. .................. 375/229; 375/230; 375/231; 708/322; 708/323; 324/763; 333/28 R

(58) Field of Classification Search ......... 375/229–231; 381/103; 333/28 R; 324/763; 708/300–410
See application file for complete search history.

(56) References Cited

U.S. PATENT DOCUMENTS

| | | | | |
|---|---|---|---|---|
| 4,888,808 | A * | 12/1989 | Ishikawa et al. | ............ 351/103 |
| 6,636,722 | B1 * | 10/2003 | Dalebroux et al. | ......... 455/67.1 |
| 2003/0054792 | A1 * | 3/2003 | Nam | .......................... 455/341 |

OTHER PUBLICATIONS

Tesche, M., "On the Use of the Hilbert Transform for Processing Measured CW Data", Aug. 1992, IEEE Transaction on Electromagnetic Compatibility, vol. 34, No. 3, pp. 259-266.*

Vasudev, N., "Measurement of a Filter Using a Power Detector", Sep. 2002, IEEE Transaction on Microwave Theory and Techniques, vol. 50, No. 9, pp. 2083-2089.*

Frederick M. Tesche, On the Use of the Hilbert Transform for Processing Measured CW Data, IEEE Transactions, vol. 34, No. 3, Aug. 1992.

Alan V. Oppenheim & Ronald W. Schafer, Discrete-Time Signal Processing, Prentice Hall Signal Processing Series.

* cited by examiner

*Primary Examiner*—Mohammad H Ghayour
*Assistant Examiner*—Sung Ahn
(74) *Attorney, Agent, or Firm*—Francis I. Gray; Michael A. Nelson; Matthew D. Rabdau

(57) ABSTRACT

A filter equalization technique for an analog signal path, such as in an instrument that simultaneously measures a signal over a band of frequencies, uses magnitude measurement data for high frequency bands for which phase-calibrated sources are not readily available. A sinusoidal signal source together with an accurate power meter is used to provide a stepped frequency input over a desired frequency band to the analog signal path with an accurate measured magnitude. The output of the analog signal path is digitized and the resulting frequency magnitudes are computed. Then the resulting power meter results are deducted from the frequency magnitudes measured each time by the instrument to determine the magnitude response of the analog signal path. Using a Hilbert transform the corresponding phase response is determined based on a minimum phase assumption over the desired frequency band. From the magnitude and phase responses an inverse or digital equalization filter may be designed for the analog signal path.

4 Claims, 2 Drawing Sheets

FILTER EQUALIZATION USING MAGNITUDE MEASUREMENT DATA

BACKGROUND OF THE INVENTION

The present invention relates to instrumentation that simultaneously measures signals over a band of frequencies, and more particularly to filter equalization for such instrumentation using magnitude measurement data to improve the accuracy of frequency and time domain measurements.

In modern telecommunications information is transmitted digitally by many modulation techniques. These techniques include modulating frequency, phase and/or magnitude. As modulation schemes have become more complex, the pressure on the telecommunications industry to provide equipment with greater accuracy has increased. Typical communications standards require good amplitude flatness and phase linearity to meet performance targets, such as bit error rate. In order to determine the accuracy of the telecommunications equipment, measurement instrumentation is required with even greater accuracy. However such measurement instrumentation contains filters that affect the magnitude and phase of different frequencies in a different manner, i.e., at one frequency the magnitude of the signal may be attenuated greater than at another frequency within the frequency passband while the phase or delay of the signal through the filter may also be affected at different frequencies. Ideally the filter should pass all frequencies within its passband with no attenuation or equal attenuation and the delay through the filter should be the same for all frequencies so there is no relative phase change from frequency to frequency within the filter passband.

For lower frequencies a current technique provides a calibrated source that outputs a plurality of frequencies in a combined signal, i.e., a signal having a comb-like frequency characteristic. The signal, after passing through several stages of filtering, is digitized and the magnitude and phase are measured and compared to known ideal results. An inverse filter is then provided to process the digitized output based upon the measurement results so that the resulting output conforms to the known ideal results.

For intermediate frequency (IF) channel equalization on radio frequency (RF)/microwave instruments, the design of the calibrated source or stimulus signal is key. For the low frequency band a repetitive broadband signal, such as a pseudorandom noise (PRN) signal, may be used as the stimulus source and readily implemented with a linear feedback shift register followed by a fast response flip-flop. The repetitive signal exhibits the comb-like spectrum. There are known magnitude and phase relationships among the spectrum lines. The channel frequency response to this stimulus signal is first measured so that the overall IF channel frequency response may be evaluated at the spectrum lines. The IF channel frequency response is finally obtained by removing the frequency response of the stimulus signal. In order to maintain good signal-to-noise ratio (SNR) for the spectrum lines, the useful part of the PRN spectrum is usually chosen to be the same order of magnitude as the signal bandwidth of the instrument.

For high frequencies, however, the PRN signal at a frequency band of interest generally does not have sufficient power to achieve the desired performance since the amplitude of the spectrum follows a sin(x)/x envelope. Other equalization sources, such as an orthogonal frequency division multiplexing (OFDM) modulation signal, may be used instead. Compared to the PRN approach, this second approach requires much more in hardware resources, such as a digital-to-analog converter (DAC), mixer and local oscillator (LO). During the manufacture or service calibration the frequency response both in magnitude and phase of the stimulus signal needs to be measured. Source calibration on up-converted OFDM signals is particularly challenging due to a lack of well specified signal generators at high frequencies. In other words for equalizing high frequency bands of a measurement instrument there is no readily available phase-calibrated source. As a result measurement errors at the high frequency bands may reach 30% or greater, which greatly exceeds the measurement accuracy required to assure that telecommunications equipment is operating correctly to provide an unambiguous communication signal.

What is desired is a technique for equalizing high frequency bands of a measurement instrument that accounts for both magnitude and phase with an accuracy greater than that required by the equipment being measured.

BRIEF SUMMARY OF THE INVENTION

Accordingly the present invention provides filter equalization using magnitude measurement data to provide an accuracy sufficient to test current complex telecommunications equipment. The filter equalization technique for an analog signal path, such as in a measurement instrument that simultaneously measures signals over a band of frequencies, uses magnitude measurement data for high frequency bands for which phase-calibrated sources are not readily available. A sinusoidal signal source together with a calibrated power meter is used to provide a stepped frequency input over a desired frequency band to the analog signal path with an accurately measured magnitude for each stepped frequency. The output of the analog signal path is digitized and the resulting frequency magnitudes are computed. Then the corresponding power meter results are deducted from the frequency magnitudes measured each time by the measurement instrument to determine the magnitude response of the analog signal path. Using a Hilbert transform the corresponding phase response is determined based on a minimum phase assumption over the desired frequency band. From the magnitude and phase responses an inverse or digital equalization filter may be designed for the analog signal path.

The objects, advantages and other novel features of the present invention are apparent from the following detailed description when read in conjunction with the appended claims and attached drawing.

DETAILED DESCRIPTION OF THE INVENTION

Figure 1:
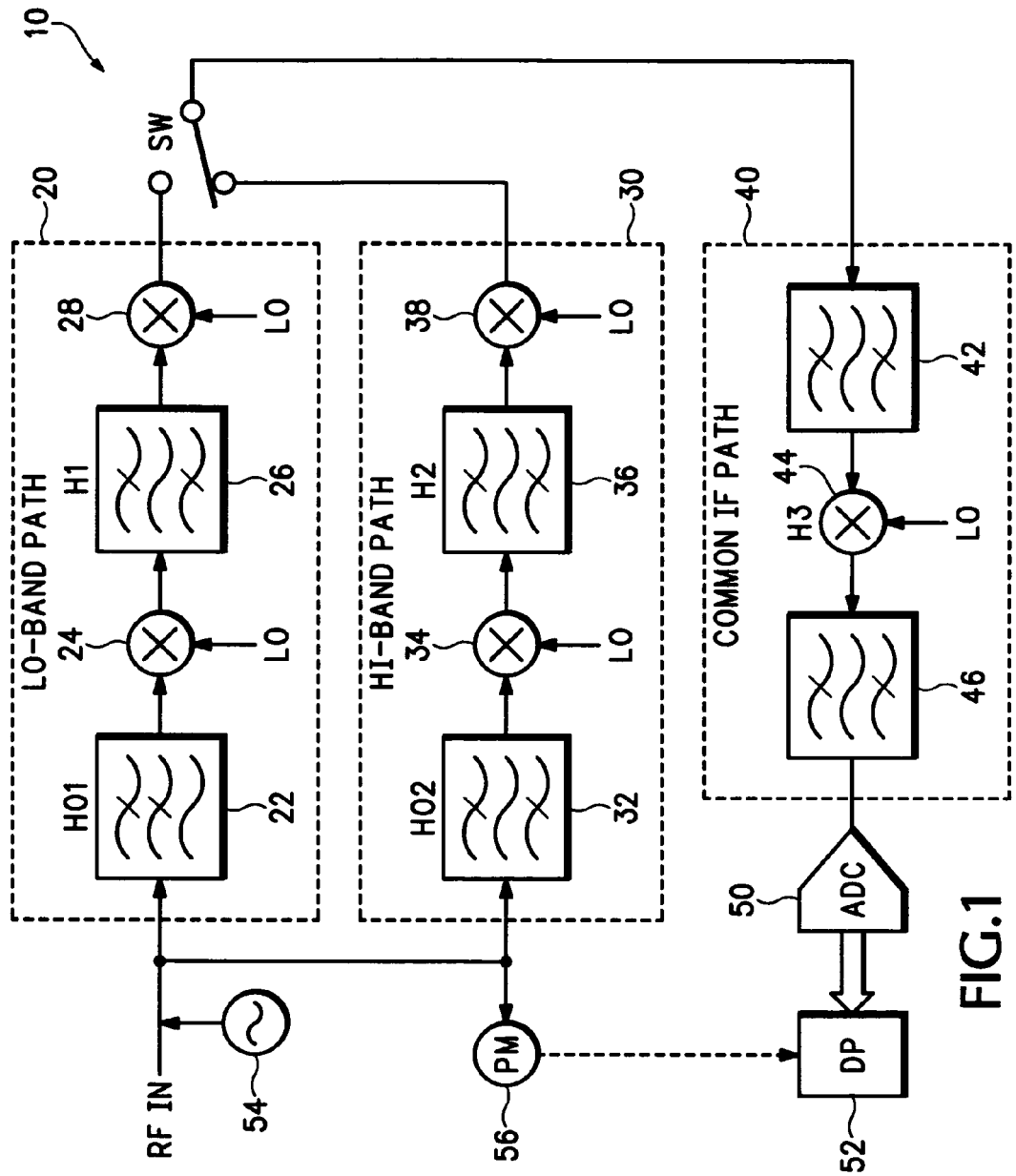
FIG. 1 is a block diagram of a typical measurement instrument having filter equalization using magnitude measurement data according to the present invention.

Referring now to FIG. 1 a front-end portion 10 of a measurement instrument, such as a vector signal analyzer, is shown having a low frequency band path 20 and a high frequency band path 30, each coupled selectively via a switch SW to a common intermediate frequency (IF) path 40. The output of the common IF path 40 is digitized by an analog-to-digital converter (ADC) 50, and the digitized result is subsequently processed by an appropriate digital processor (DP) 52. The low frequency band path 20 includes in series a wideband lowpass filter 22, a first lowband mixer 24, a lowband IF filter 26 and a second lowband mixer 28. The output from the second lowband mixer 28 is input to a first pole of the switch SW. The high frequency band path 30 includes in series a wideband bandpass filter 32, a first highband mixer 34, a highband IF filter 36 and a second highband mixer 38. The output from the second highband mixer 38 is input to a second pole of the switch SW. The output from the switch SW is input to the common IF path 40 that includes in series a first IF filter 42, an IF mixer 44 and a second IF filter 46. The output from the second IF filter 46 is input to the ADC 50.

Applied to the wideband lowpass filters 22, 32 as a radio frequency (RF) signal is a single frequency sinusoidal signal from a high frequency sine wave source 54. A power meter (PM) 56 is coupled to measure the amplitude of the single frequency sinusoidal signal. High frequency calibrated power meters for use as the power meter 56 are available, which power meters are calibrated according to National Institute of Standards and Technology (NIST) standards to a high degree of accuracy. To perform the filter equalization, as described below, the high frequency sine wave source 54 is stepped from one frequency to another in discrete increments, and the magnitude at each frequency is measured to a high degree of accuracy by the power meter 56 and stored in the DP 52.

The processing of the magnitude measurements from the power meter 56 and from the output of the ADC 50 is based on the fact that analog filters used in measurement instruments have a good approximation to ideal analog filters with minimum phase property. For systems described by linear constant-coefficient differential equations, if the magnitude of the frequency response and the number of poles and zeros are known, then there are only a finite number of choices for the associated phase. In the case of minimum phase the frequency response magnitude specifies the phase uniquely, as described by A. V. Openheim and R. W. Schafer in *Digital Signal Processing*, published by Prentice-Hall (1989). As an example the technique has been applied to construct a transient response with only the magnitude of the response spectrum, as discussed by F. M. Tesche in *On the Use of the Hilbert Transform for Processing Measured CW Data*, IEEE Transactions On Electromagnetic Compatibility, Vol. 34, No. 3, August 1992. A minimum phase system has all its poles and zeros inside a unit circle. If H1 and H2 are two minimum phase systems, then H1*H2 and H1/H2 also are minimum phase systems since the resulting systems still have all poles and zeros inside the unit circle. This property is applied to the estimation of frequency response differences between the lowband path 20 and the highband path 30 based on the magnitude measurements.

In general RF and microwave filters are all-pole filters due to the simple physical implementation, and the passbands of such filters are a good approximation of all-pole filters, such as the Chebyshev filter. The lack of zeros allows use of only the partial passband magnitude to estimate reasonably well the phase in the corresponding frequencies. This is significant since the signal bandwidth of the measurement instrument incorporating these filters may be substantially less than the bandwidth of the IF filters 26, 36 immediately following the first mixer 24, 34 in the signal path 20, 30.

For each complete filter measurement the various IF and RF frequencies in actual use are specific to the respective individual paths 20, 30 of FIG. 1. For the purposes of the filter measurement and synthesis of the correction, the total passband response is mathematically assumed to be centered around one single frequency, with all of the separate filters simply connected in cascade. Therefore if the individual IF or RF frequencies are changed for a different analysis setup, a new measurement and correction is performed for the new setup where different portions of the individual filters are actually in use. Although the frequency responses may have a contribution from all frequency devices in the respective paths, the analog filters are the dominant contributors. The common IF mixer 44 combines all frequency responses of the devices present in the common IF path 40. Let R be a complex vector containing both phase and magnitude during a calibration where R is a frequency response difference H1/H2 between the lowband and highband IF filters 26, 36. H1 is the frequency response for the lowband IF filter 26 and H2 is the frequency response for the highband IF filter 36. For the respective RF filters 22, 32 a value L also is measured as a complex vector between the two filters H01/H02, where H01 is the frequency response for the lowband RF filter 22 and H02 is the frequency response for the highband RF filter 32. A PRN calibration source (not shown), as in the prior art, may be used to measure the lowband frequency response P1=H01*H1*H3 during run time, where H3 is the frequency response for the common IF path 40. The highband path 30 frequency response is then P2=H02*H2*H3=P1/L/R where L and R are measured during calibration. In general H3 is much more temperature sensitive than H1 and H2 due to the relatively narrower bandwidth, high gain and longer signal path with many gain stages.

A Hilbert Transform technique may be used to relate the phase of a frequency to the logarithm of its associated magnitude part in a minimum phase system as follows:

1) Step both the input CW frequency from the source 54 and the center frequency of the lowband path 20 (by correspondingly stepping the LO frequency input to the lowband mixer 24) to measure a magnitude response Al over a bandwidth of interest. The measured bandwidth should be slightly larger than a required design signal bandwidth. Al is the magnitude response of the RF filter 22 only.
2) Step both the input CW frequency and the center frequency of the highband path 30 to measure a magnitude response A2 over the bandwidth of interest for the RF filter 32. Then |L|=A1/A2.
3) Step the input CW frequency on the lowband path 20 (without changing the LO frequency) to measure a magnitude response B1. B1 combines the magnitude responses of both the RF and IF filters 22, 26.
4) Step the input CW frequency on the highband path 30 to measure a magnitude response B2 of both the RF and IF filters 32, 36. Then |R| is computed as B1/B2/|L|.
5) Use the Hilbert Transform to compute the phase out of |R| to obtain R with both phase and magnitude response. Similarly compute L from |L|.
6) Store R and L as calibration data in the measurement instrument for later use.
7) Measure the lowband path frequency response P1 with an internal generated source (not shown), such as PRN, during run time. The highband path frequency response is P2=P1/L/R.
8) Use the calculated P2 to provide filter equalization for the highband path 30.

In the above notation "/" in the frequency domain is equivalent to subtracting the respective frequency spectra. Also note that to obtain each magnitude response the corresponding magnitude for each stepped frequency measured by the power meter 56 is deducted from the magnitude computed from the output of the ADC 50.

Figure 2:
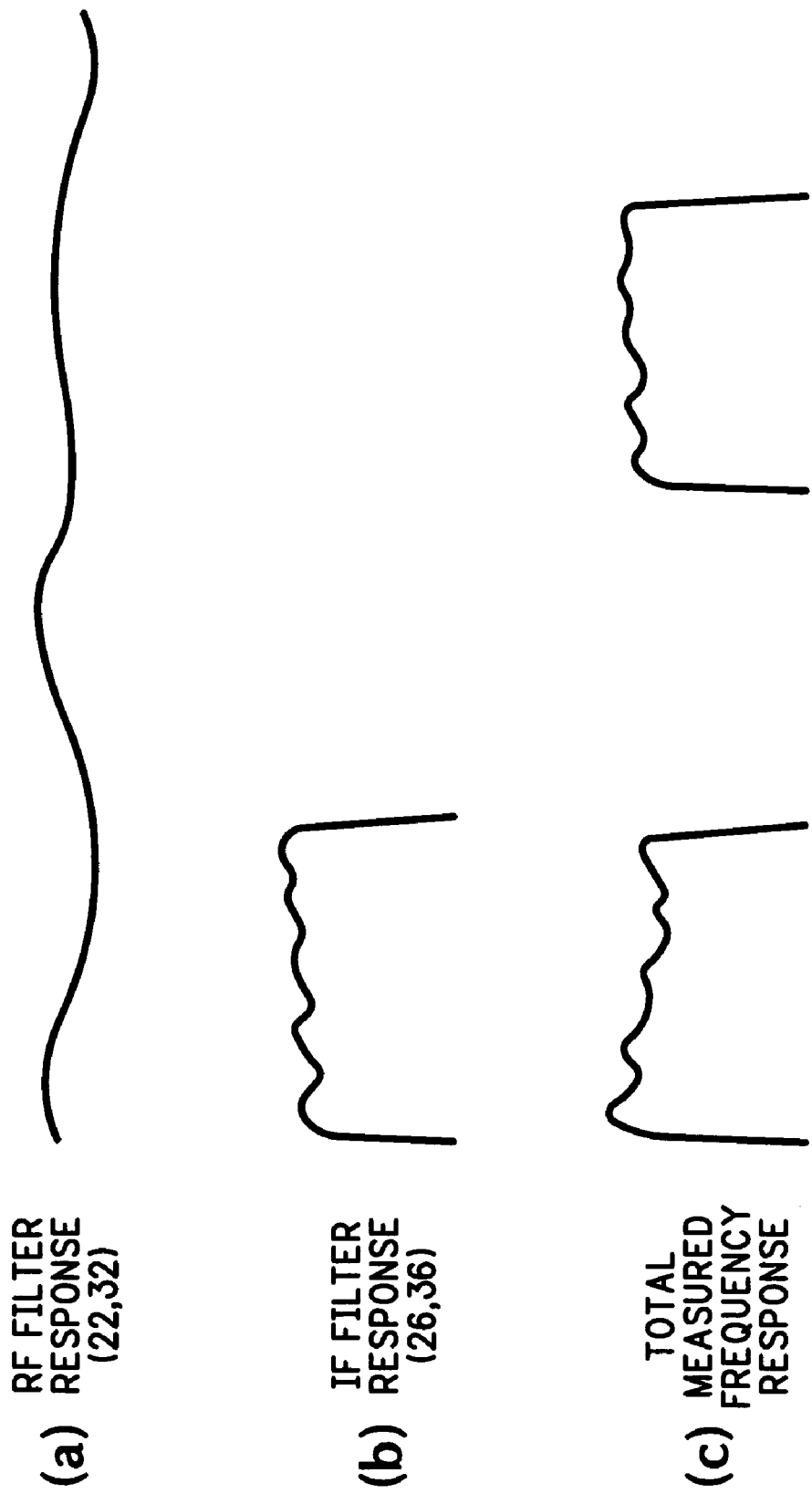
FIG. 2 is a graphic view of waveforms associated with filter equalization according to the present invention.

As shown in FIG. 2 a measured frequency spectrum (a) for the RF filter 22, 32 is shown as a result of steps 1 and 2 above.

Then from steps 3 and 4 the total frequency response (c) for both the RF and IF filters 22, 26; 32, 36 is shown. The difference between the two results in the frequency responses of the RF filter 22, 32 and the total frequency response is the frequency response (b) for the IF filter 26, 36.

Thus the present invention provides filter equalization using magnitude measurement data by obtaining a magnitude response for an analog signal path over a specified frequency band, deriving from the magnitude response a phase response for the analog signal path based on a minimum phase assumption, and designing a digital equalizer filter from the magnitude and phase responses to provide the filter equalization for the analog signal path.

What is claimed is:

1. A method of filter equalization for an analog signal path comprising the steps of:
    obtaining a magnitude response for the analog signal path over a specified frequency band;
    deriving from the magnitude response a phase response for the analog signal path based on a minimum phase assumption over the specified frequency band;
    using the magnitude and phase responses to provide the filter equalization;
    storing the magnitude and phase responses as calibration data in a measurement instrument containing the analog signal path;
    measuring a lowband frequency response for the measurement instrument using an internal source during run time of the measurement instrument; and
    calculating a highband frequency response for the measurement instrument using the lowband frequency response and the calibration data.

2. The method as recited in claim 1 wherein the using step comprises the step of using the highband frequency response to adjust the filter equalization.

3. A method of filter equalization for an analog signal path having a lowband path and a highband path, each path having an RF (Radio Frequency) filter and an IF (Intermediate Frequency) filter, comprising the steps of:
    obtaining an RF magnitude response for the RF filters over a specified frequency band;
    obtaining a combined magnitude response for the combined RF and IF filters over the specified frequency band;
    deriving an IF magnitude response for the IF filters from the RF and combined magnitude responses;
    calculating an RF phase response from the RF magnitude response and an IF phase response from the IF magnitude response based on a minimum phase assumption over the specified frequency band to generate respective RF and IF frequency response vectors for use in providing the filter equalization;
    storing the RF and IF frequency response vectors as calibration data in a measurement instrument containing the analog signal path;
    determining a lowband frequency response for the measurement instrument using an internal source during run time of the measurement instrument; and
    calculating a highband frequency response for the measurement instrument using the lowband frequency response and the calibration data.

4. The method as recited in claim 3 further comprising the step of using the highband frequency response to adjust the filter equalization.

* * * * *